(12) United States Patent
Yeh et al.

(10) Patent No.: US 8,612,138 B2
(45) Date of Patent: Dec. 17, 2013

(54) LANE-BASED ROAD TRANSPORT INFORMATION GENERATION

(75) Inventors: Anthony Garon Yeh, Pokfulam (HK); Yang Yue, Hubei (CN)

(73) Assignee: The University of Hong Kong, Hong Kong (HK)

( * ) Notice: Subject to any disclaimer, the term of this patent is extended or adjusted under 35 U.S.C. 154(b) by 118 days.

(21) Appl. No.: 13/233,892

(22) Filed: Sep. 15, 2011

(65) Prior Publication Data

US 2012/0065878 A1    Mar. 15, 2012

Related U.S. Application Data

(60) Provisional application No. 61/383,162, filed on Sep. 15, 2010.

(51) Int. Cl.
*G06F 3/00* (2006.01)

(52) U.S. Cl.
USPC .......................................................... 701/409

(58) Field of Classification Search
USPC .................. 701/400, 409, 450, 461, 489, 512
See application file for complete search history.

(56) References Cited

U.S. PATENT DOCUMENTS

| | | | |
|---|---|---|---|
| 5,115,398 A * | 5/1992 | De Jong | 701/523 |
| 5,936,553 A * | 8/1999 | Kabel | 340/995.14 |
| 6,047,234 A * | 4/2000 | Cherveny et al. | 701/451 |
| 6,622,085 B1 * | 9/2003 | Amita et al. | 340/995.14 |
| 2006/0287819 A1 * | 12/2006 | Brulle-Drews et al. | 701/211 |
| 2008/0091327 A1 * | 4/2008 | Tsuchiya et al. | 701/93 |
| 2010/0086174 A1 * | 4/2010 | Kmiecik et al. | 382/103 |

* cited by examiner

*Primary Examiner* — Khoi Tran
*Assistant Examiner* — Adam Mott
(74) *Attorney, Agent, or Firm* — Berkely Law & Technology Group, LLP (57) ABSTRACT

Example methods, apparatuses, or articles of manufacture are disclosed that may be implemented using one or more computing devices to facilitate or otherwise support one or more processes or operations associated with lane-based road transport information generation, such as for use in or with, for example, vehicle navigation management systems.

17 Claims, 6 Drawing Sheets

FIG. 1

(a) Road Mark Information Database
(b) Extension of Road Marks to Form Lane Polygons
(c) Creation of Lane Polygons
(d) Generation of Lane Centrelines and Nodes from Lane Polyons ■ Node
● New Node

LANE-BASED ROAD TRANSPORT INFORMATION GENERATION

CROSS-REFERENCE TO RELATED APPLICATIONS

The present application claims priority to U.S. Provisional Patent Application Ser. No. 61/383,162, entitled "Lane-Based Road Network Signal Information Generation," by Anthony Garon Yeh and Yang Yue, filed on Sep. 15, 2010, herein incorporated by reference in its entirety and assigned to the assignee of the currently claimed subject matter.

BACKGROUND

1. Field

The present disclosure relates generally to navigation information processing and, more particularly, to lane-based road transport information generation, such as for use in or with navigation management systems including, for example, vehicle navigation systems.

2. Information

Traffic or road marks or markings may be desirable for vehicle navigation, road traffic safety, road networks conditioning (e.g., traffic congestion reduction, etc.), etc. and may be used on roadways, such as, for example, paved roads (e.g., freeways, highways, streets, etc.) or otherwise, so as to convey official traffic information or provide traffic guidance to motorists, bicyclists, pedestrians, or other parties. To illustrate, traffic or road markings may convey or indicate, for example, a speed limit, road or line direction, turning information, etc. such that a motorist, bicyclist, etc. may determine, among other things, which lane to take to his or her desired destination. In addition, traffic or road markings may guide motorists, bicyclists, etc. if changing lanes, such as to indicate whether a motorist, bicyclist, etc. may utilize a particular part of a road, lane, etc., or as to timing of utilization (e.g., carpool lane, etc.). Also, traffic or road markings may indicate if one, such as a motorist or cyclist, should stop or wait before proceeding further, or the like. Traffic or road markings may also define a road or lane boundary, layout, as well as lane topological relationship or lane connectivity. For example, a solid line or boundary may mean that passing (e.g., crossing the line or boundary) is generally prohibited or that a motorist, etc. should stay or keep moving in a particular lane, while a dashed or broken line may mean that passing or changing lanes is generally allowed. Also, a combination of a solid line with a dashed line dividing a road into two sides may mean that passing is generally allowed from the side with the dashed line and generally prohibited from the side with the solid line, just to illustrate another example.

Generally, it may be desirable for lane-based road network topology to be sufficiently reliable, accurate, or safe, particularly in association with vehicle navigation, for example. In transport-related technologies or infrastructures, navigation information, such as traffic or road marking information (e.g., road network topology, traffic regulations, etc.) may facilitate or support one or more processes associated with intelligent road navigation or transportation systems, such as an Advanced Driver Assistance System (ADAS), Lane Departure Warning System (LDWS), Transport Geographic Information System (TGIS), or the like. As such, accurate tracking of lane-related road details for intelligent road navigation or transportation systems, for example, may be desirable so as to convey reliable information to motorists, etc. in terms of driving guidelines or instructions, which in turn may facilitate or support safer conditions. However, road network transport information (e.g. topology, etc.) may typically be added or entered into a suitable database (e.g., for navigation, transportation, etc.) manually. Such a process may be time-consuming, labor-intensive, or otherwise complex, and such complexity may make it error-prone. Accordingly, there is a need to streamline or simplify entry of such information.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used, in whole or in part, to facilitate or support one or more processes or operations for lane-based road transport information generation including, for example, network transport information. Information generation may be implemented, at least in part, in connection with any suitable information management system, such as a navigation management system, as one possible example. In this context, lane-based road transport information may refer to transport information, typically in a form to be stored or to be transmitted and received, for example, that may describe or characterize one or more aspects of one or more networked roads. In some instances, lane-based road transport information may, for example, be based, at least in part, on recognition, detection, or tracking of one or more lanes of the one or more roads. Typically, although not necessarily, a form of transport information may allow for or otherwise result in a graphical representation of one or more roads. As will be described in greater detail below, lane-based road transport information may comprise, for example, any suitable lane-related road transport information including lane centerlines, lane-based road topology, lane-based driving or navigation transport information, or the like. To illustrate, navigation management systems may utilize, in whole or in part, suitable lane-based road network transport information and may comprise, for example, adaptive traffic light control systems utilizing lane-based information, lane-based traffic or transport information dissemination or management systems, intelligent lane-based vehicle navigation systems (e.g., in-vehicle, external, etc.), such as an Advanced Driver Assistance System (ADAS) including a Lane Departure Warning System (LDWS), Intelligent Speed Assistance System (ISAS), or the like. Information, as referred to in this document, is related to transport and traffic signals and information, such as and not limited to vectors, lines, lane boundaries, road marks, directions, signs, speed limits, traffic signals and regulations, lane changing and turning directions and restrictions, junctions and turning directions and restrictions, and place names.

As illustrated in example implementations described herein, lane-based road transport information may be effectively or efficiently generated, for example, from any suitable information repository, database, or system that may be capable of capturing, storing, analyzing, managing, or otherwise presenting transport information with respect to one or more roads in one or more geographic locations. For example, lane-based road transport information may be generated, at least in part, from one or more suitable road mark or road marking databases (e.g., navigation, traffic, etc.) installed, maintained, regulated, supported, etc. by a governmental entity, private entity (e.g., transportation, urban planning department(s), etc.), or any combination thereof. To illustrate, suitable lane-based road transport information may, for example, be generated, at least in part, from one or more Geographic Information Systems (GIS), such as a Transport Geographic Information System (TGIS), though claimed subject matter is not limited in this regard.

Typically, although not necessarily, road marking databases may include, for example, a variety of road marking or road-related transport information, such as, for example, information representing lane boundaries, lane directions, speeds, or the like. Road transport information may be obtained, at least in part, from raster images, as well as engineering drawings, road maps, etc., captured or otherwise created in some cases from aerial images, remote sensing, land surveying, and so forth. Raster images or raster image transport information may comprise, for example, a type of a digital information, such as a digital image, structured so as to form one or more reducible or enlargeable grids (e.g., via graphical representation, etc.), for example. Raster images with respect to road marking transport information, for example, may be digitized, processed, or converted to a graphical vector format using one or more suitable processing techniques and may be stored in a road marking database, as one possible example. Typically, in a vector database, road marking transport information may be represented via one or more geometric or similar features (e.g., points, lines, polygons, etc.), for example, capable of being employed in a graphical representation to spatially depict road-related transport information (e.g., road markings, etc.), such as via a use of a special purpose software application, for example, capable of being executed on a computing device or system, such as a special purpose computing device or system. Of course, these are intended as examples relating to various road marking databases, and claimed subject matter is not necessarily so limited. It should also be noted that terms "road marking information" or "road-related transport information" may be used interchangeably.

Road-related transport information, such as lane boundary marking information, traffic marking information, etc. stored in one or more computing systems or platforms associated, for example, with a road marking database (e.g., vector, etc.) may convey comprehensive or otherwise sufficient navigation transport information in terms of road network geometry, topology, traffic regulations, etc. As such, lane boundary marking or like road-related transport information may be advantageously utilized, for example, so as to generate lane-based road transport information, which in turn may be used to generate, update, etc. suitable lane-based navigation transport information databases. As will be described in greater detail below, based, at least in part, on stored lane boundary marking transport information, for example, in an embodiment, one or more lane polygons may, for example, be extracted in connection with an application of a lane polygon extraction-type approach or method. In this context, the term lane polygon refers to transport information providing a geometric construct in which lanes of a road may be identified based at least in part on features captured in a form to depict or describe a road. Based, at least in part, on one or more extracted lane polygons, one or more corresponding lane centerlines may be derived or otherwise generated using a suitable road navigation database (e.g., featuring lane centerlines, etc.), such as TGIS network, for example, though claimed subject matter is not limited in this regard. In an embodiment, lane topological relationships or other features (e.g., lane directions, speed limit markings, turning information, etc.) may be added to a road network arrangement, for example, by overlaying road traffic markings on or over one or more extracted lane polygons, thus, generating comprehensive or desired road traffic or navigation transport information, as an example. Accordingly, road traffic or navigation transport information may be subsequently combined or otherwise integrated with lane centerlines, for example, to generate or otherwise produce lane-based road network transport information comprising, for example, lane centerlines as well as various related transport information (e.g., lane-based topology, lane-based navigation or driving information, etc.) that may be used, at least in part, in or with one or more road navigation transport information databases. As was indicated, lane-based road network transport information may be advantageously utilized, for example, to effectively or efficiently facilitate or support updating suitable transport or road-related databases (e.g., with lane-related transport information, etc.).

Figure 1:
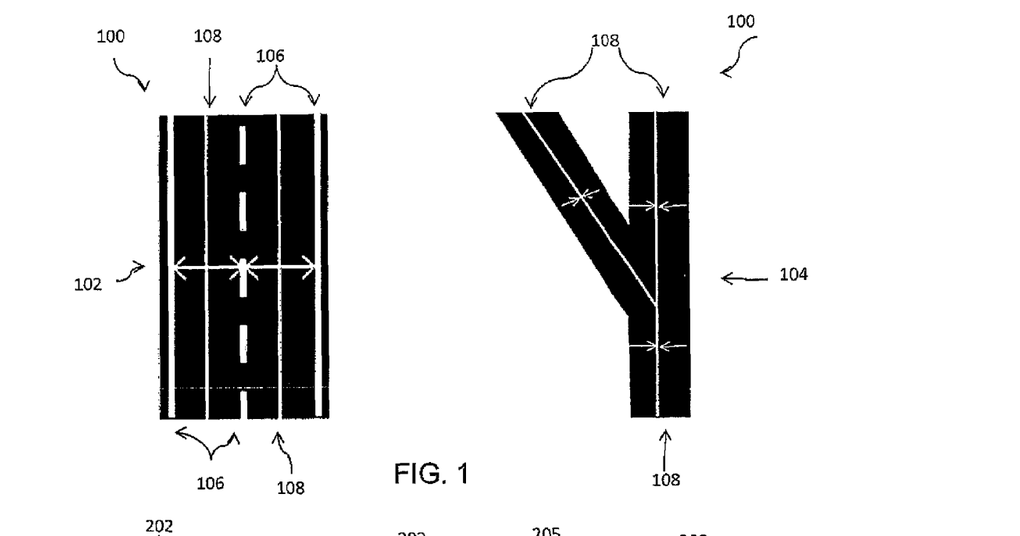
FIG. 1 is a schematic diagram illustrating example portions of a road.
Figure 2:
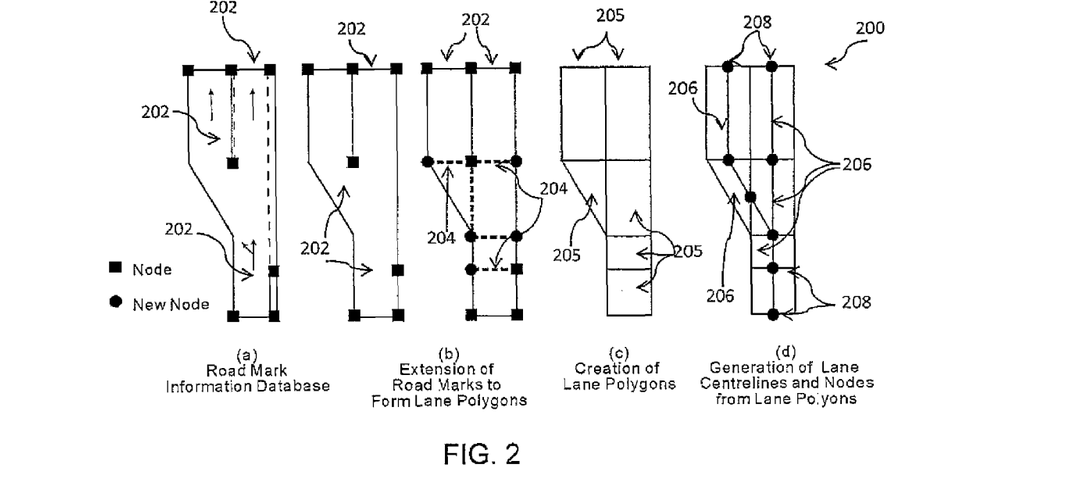
FIG. 2 is a schematic diagram illustrating an example in which lane centerlines and nodes have been generated.

Attention is now drawn to FIG. 1, which is an illustration of portions of a road 100 with example road markings with respect to various lane geometries, such as parallel lanes 102 and merging/splitting lanes 104, respectively. As seen, road markings, indicated generally by a reference numeral at 106, may define lane boundaries and, as such, may serve as sufficiently desirable elements of a road that may typically, although not necessarily, be stored in one or more suitable road marking transport information databases (e.g., a vector road marking database, etc.) created, maintained, etc. by a suitable organization or entity, as previously mentioned. Based, at least in part, on road marking transport information (e.g., associated with a road marking information database, etc.), such as road markings 106 defining lane boundaries of road 100, for example, lane centerlines 108 may be extracted or otherwise generated using, at least in part, an embodiment of a lane polygon extraction-type approach or method, as described in more detail below.

FIGS. 2 and 3A-3I illustrate examples of a summary 200 and a portion of a road 300, respectively, in terms of an example progression of generating lane centerlines and nodes via an example lane polygon extraction-type approach or method that may be used, partially, dominantly, or substantially, to facilitate or support one or more processes or operations associated with generation of lane-based road transport information. Claimed subject matter is not limited to such an example summary or progression, of course. As particularly seen in FIG. 2, one or more lanes, such as lanes 202, may be conceptually represented as comprising, for example, a series of lane polygons. For example, as will also be seen, road markings (e.g., markings 106 defining lane boundaries of a road in FIG. 1, etc.) obtained from a suitable road marking transport information database may be extended to form lane polygons, as illustrated generally by dashed lines at 204. Based, at least in part, on created polygons, such as polygons 205, for example, one or more corresponding lane centerlines, illustrated generally at 206, as well as nodes, illustrated generally at 208, may be derived or otherwise located. Accordingly, a lane network may be generated, for example, by connecting lane centerlines 206 and nodes 208, as will be described in greater detail below.

Figure 3A:
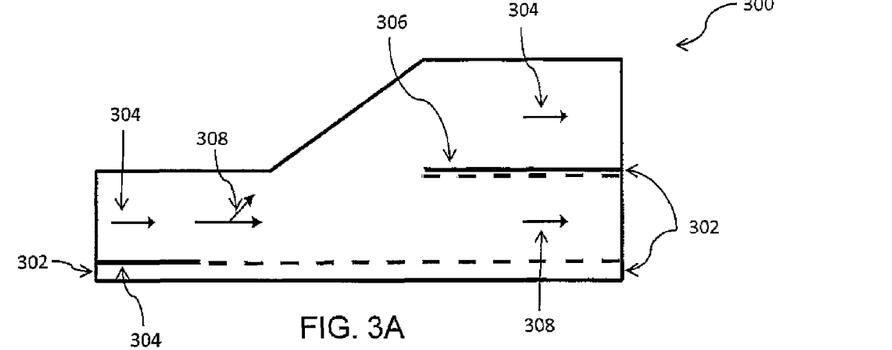
FIG. 3A is a schematic diagram illustrating an example of a portion of a graphical representation of a road in a road marking database.

More specifically, suitable road marking transport information may be extracted, for example, from one or more road marking databases (e.g., vector, etc.) comprising, at least in part, a variety of road-related maps, such as an example vector lane-based road marking map of FIG. 3A illustrating a portion of a road 300. Road markings may comprise, for example, lane boundary markings, indicated generally by a reference numeral at 302, and road traffic markings (e.g., lane directions, speed limits, lane information etc.), as indicated generally at 304. For example, a double boundary line 304 may indicate or convey transport information with respect to a portion of road 300 in which passing (e.g., crossing the line) is generally prohibited. In addition, a combination of a solid line with a dashed line 306, for example, may indicate that passing is generally allowed from the side with the dashed line. Also, turn or through arrows, such as arrows 308, for example, may indicate that turning is allowed from a particular line or at a particular portion of road 300 or that only through traffic (e.g., no turning, etc.) is allowed. Of course, these are merely examples relating to road markings, and claimed subject matter is not limited in this regard.

Figure 3B:
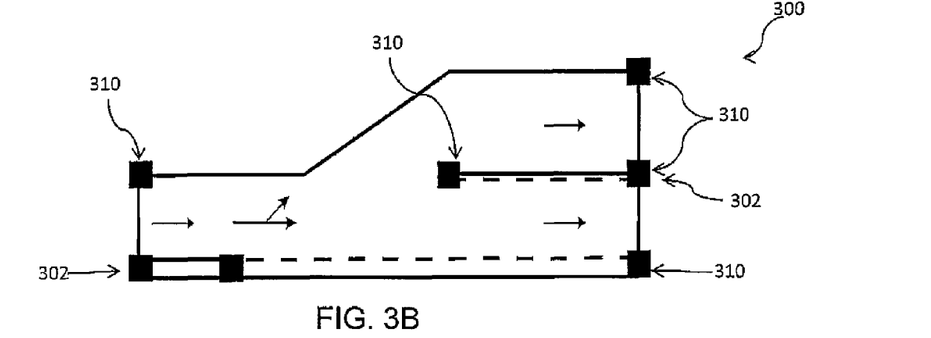
FIG. 3B is a schematic diagram illustrating an example of a portion of a graphical representation of end-nodes of lane boundaries.

FIGS. 3B-3I provide illustrative details with respect to extraction of lane polygons from road marking transport information, such as, for example, lane boundary lines, though claimed subject matter is not so limited. As seen in FIG. 3B, lane boundary markings, indicated generally at 302, may be stored (e.g., in a road marking database, etc.) or displayed in accordance with a particular type of a boundary line (e.g., double solid lines, broken or dashed lines, etc.), just to illustrate one possible implementation. Even though lane boundary markings may be displayed differently (e.g., according to a type of line), lanes stored, for example, in a road marking database may nevertheless be represented as one or more polyline segments (e.g., via a polygonal chain, etc.) that may include one or more arrays of points or nodes, such as end-nodes 310.

Figure 3C:
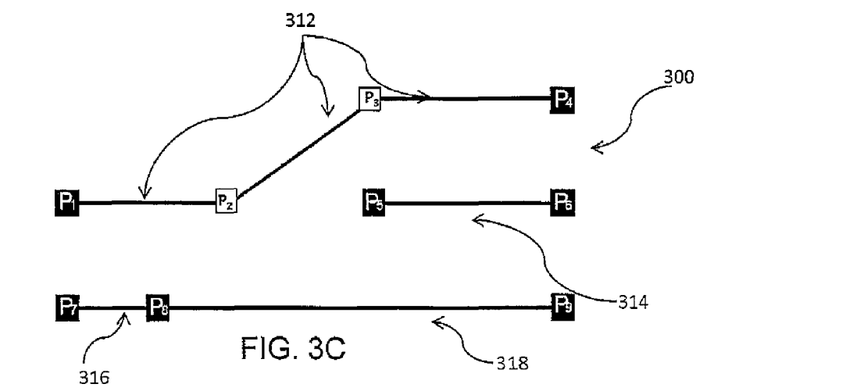
FIGS. 3C through 3I are schematic diagrams illustrating aspects of an example extraction of lane polygons from road marking transport information.

FIG. 3C is a representation of lane boundary lines along with corresponding nodes that may be stored, for example, in a road marking database, such as a vector road marking database, just to illustrate one possible implementation. As a way of illustration, a boundary line 312 may comprise, for example, nodes P1->P2->P3->P4, a boundary line 314 may comprise nodes P5->P6, a boundary line 316 may comprise nodes P7->P8, and a boundary line 318 may comprise nodes P8->P9. In one particular implementation, to which claimed subject matter is not limited, one or more nodes associated with a road marking database may be characterized or classified, for example, as:

A-type nodes. End-node of lane boundary: P1, P4, P5, P6, P7, P8, and P9.

B-type nodes. End-node of road: P1, P4, P6, P7, and P9.

C-type nodes. Non-end-nods (e.g., intermediate, etc.): P2 and P3.

D-type nodes. Non-end-node of a road [A-type nodes collection-B-type nodes collection] (e.g., via subtraction, etc.): P5, P8. Of course, these are merely details relating to various nodes for an embodiment, and claimed subject matter is not intended to be limited in this regard.

Figure 3D:
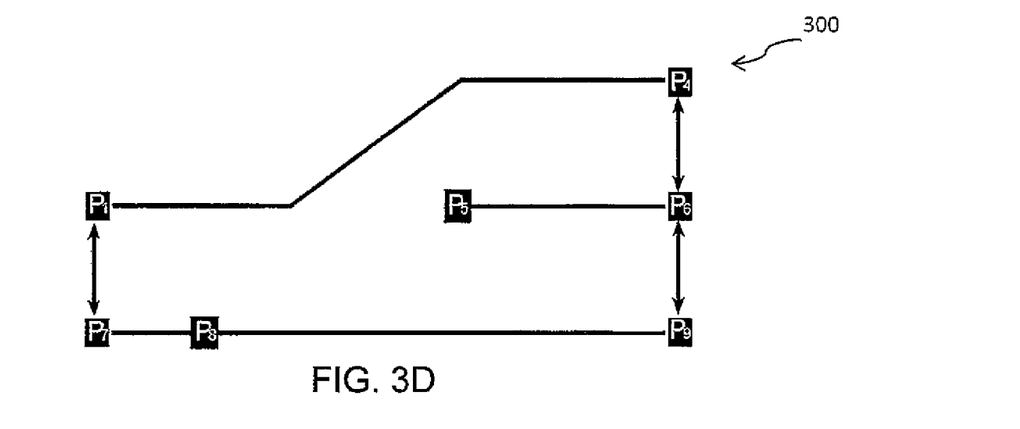

Continuing now with FIG. 3D, an illustration of an example operation or process of how road 300 may be enclosed, for example, using B-type node collection or end-nodes is provided, though claimed subject is not so limited. To illustrate, an operation or process may begin with a number of B-types nodes, such as end-nodes P1, P4, P6, P7 and P9, for example, searching (e.g., electronically, etc.) for a near or nearest node or nodes associated with B-type node collection. Although claimed subject matter is not limited in this regard, if there is a particular (e.g., suitable, desired, etc.) distance between identified B-type nodes, for example, then these nodes may be connected. Optionally or alternatively, end-nodes may be connected without regard to a particular distance. In one particular implementation, desirable distance between sample nodes (e.g., Pi and Pj, etc.) may comprise, for example, a distance more than 2 meters and less than 3.5 meters (e.g., 2 meters<Distance (Pi,Pj)<3.5 meters), though claimed subject matter is not so limited. As seen in this particular non-limiting example, five nodes (e.g., P1, P4, P6, P7 and P9) have been identified and matched into three groups (e.g., [P1<->P7], [P4<->P6], and [P6<->P9] etc.) so as to enclose road 300.

Figure 3E:
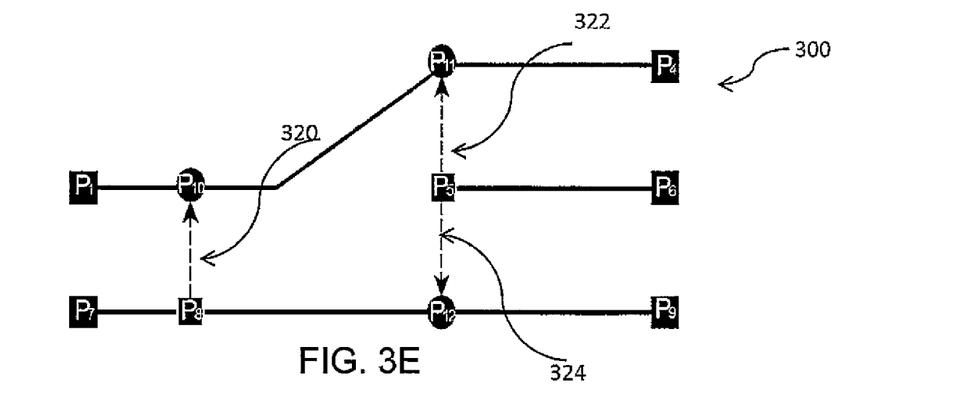

As further illustrated in FIG. 3E, D-type nodes may, for example, be used, at least in part, to obtain or create additional or corresponding nodes associated with a near or nearest boundary line. To illustrate, additional or corresponding nodes may be created by starting with D-type nodes, such as nodes P5 and P8, for example, and performing one or more projections onto a near or nearest lane boundary. This may include, for example, generating additional or corresponding nodes for D-type nodes collection that may be inserted into or placed on one or more lane boundary lines, as was previously mentioned. As seen, for example, three projections, such as projections P8->P10, P5->P11, and P5->P12, indicated generally at 320, 322, and 324, respectively, may be performed in this case. It should be noted that in certain implementations, one or more additional or corresponding nodes may be positioned relatively close to already existing node or nodes in a line (e.g., the same boundary line, etc.), such as, for example, additional node P11 and existing node P3 (e.g., of FIG. 3C). If a distance between a new and existing node is sufficiently close, then both nodes may be treated as one node. For example, in one particular implementation, a distance of 0.1 meter (e.g., Distance (P11, P3)<threshold (0.1 meters)) may be used as a criterion. Node P12 may be sufficiently distanced or positioned a sufficient distance apart from nodes P8 or P9 (e.g., in the same boundary line, etc.), and, thus, may be treated as a separate node. Again, this is merely an example to which claimed subject matter is not intended to be limited.

Figure 3F:
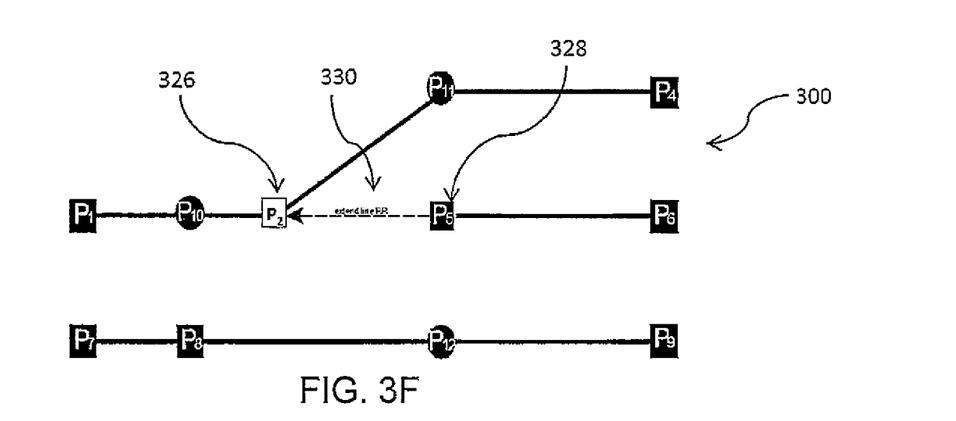

As seen in FIG. 3F, a seed node P2, indicated at 326, may be located or obtained, for example by extending a middle lane boundary line. More specifically, D-type nodes that have, for example, two or more projections may be checked or located. A node P5, indicated at 328, may satisfy this criterion, for example. Node P5 may comprise, for example, an end-node of a middle lane boundary line. Line (P6, P5) may be extended, for example, along a direction of P6->P5 to search for a close or closest existing node from a near or nearest line. For example, P2 may comprise a close or closest existing node to a projected line of (P6, P5). Node P2 may not be precisely on an extended line or the extended line may have an intersection with another lane boundary line. Typically, although not necessarily, at least one existing node may be located. Accordingly, nodes P5 and P2 may be connected, as indicated by a dashed arrow at 330 (e.g., P5->P2), and node P2 may be located and treated as a seed node. Of course, these are merely examples of details to which claimed subject matter is not limited.

Figure 3G:
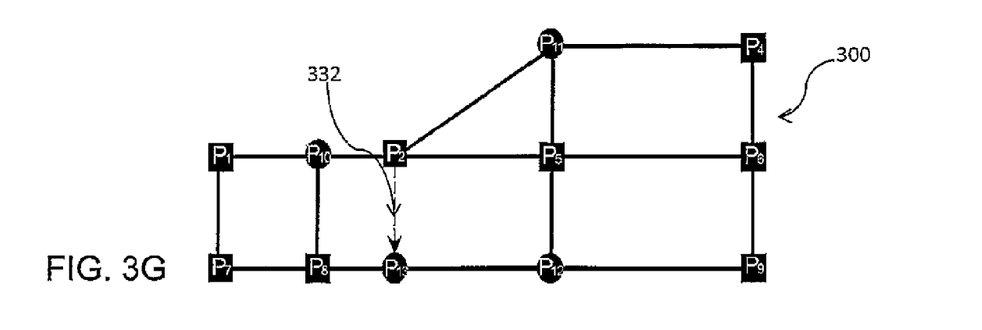

Likewise, as illustrated in FIG. 3G, using one or more seed nodes, one or more corresponding nodes (e.g., from a near or nearest lane boundary, etc.) may be located or obtained. For example, a projection from seed node P2 may be performed in a similar fashion, as indicated by an arrow at 332, and a node P13 may be located or obtained. Nodes P2 and P13 may, for example, be connected. Thus, consider: P2->P13. Again, this is merely one example, and claimed subject matter is not intended to be limited to this example.

Figure 3H:
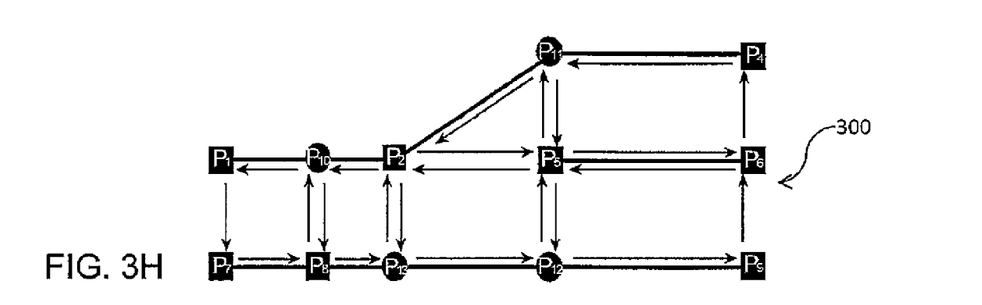

Continuing now with FIG. 3H, an enclosed area of road 300 may be searched, for example, so as to determine whether located nodes and polyline segments are sufficiently bounded so as to separate a road area into one or more quadrangular lane polygons, triangular lane polygons, or any combination thereof. For example, as illustrated, moving counter-clockwise (e.g., from a suitable node, etc.), a search for a small or smallest circular or closed point sequence, such as a closed polygonal chain or sequence, for example, may be performed, at least in part, by following series of link connections (e.g., connecting nodes, etc.), thus, generating one or more quadrangular lane polygons, triangular lane polygons, or any combination thereof. If a sequence comprising, for example, more than four points is found, then one or more operations described in connection with FIGS. 3C-3G may be repeated until a more complex polygon is split into one or more quadrangular lane polygons, triangular lane polygons, or any combination thereof.

Figures 3I, 3J:
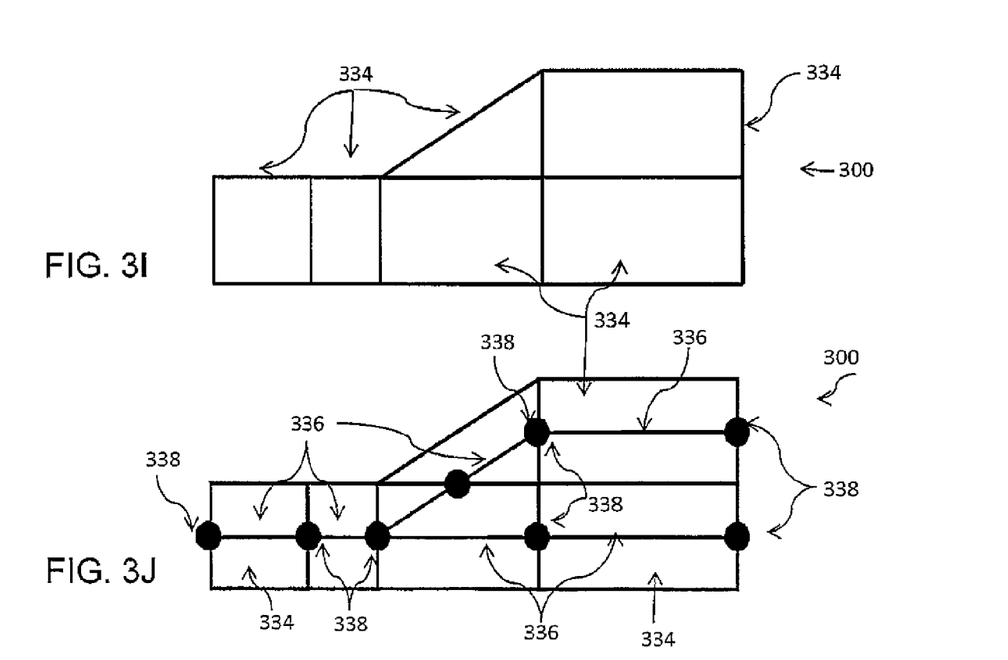
FIG. 3J is a schematic diagram illustrating an example generation of lane centerlines and nodes from lane polygons.

FIG. 3I illustrates extracted or generated lane polygons 334 associated with road 300. For example, five quadrangular lane polygons and one triangular lane polygon may be extracted or generated, just to illustrate one possible implementation. Lane polygons may be subsequently used, for example, to efficiently or effectively) generate or derive one or more lane centerlines, such as lane centerlines 206 of FIG. 2, as well as suitable nodes (e.g., nodes 208 of FIG. 2). For example, as particularly seen in FIG. 3J, one or more lane centerlines, such as lane centerlines 336 may be obtained or derived, at least in part, by finding and connecting one or more centerlines of generated one or more lane polygons 334. A lane transport network may be generated, for example, by connecting lane centerlines and nodes (e.g., 206 and 208 of FIG. 2), as previously mentioned. In one particular implementation, one or more centerlines may be derived or generated using, for example, a Voronoi graph-related method or technique, though claimed subject matter is not limited in this regard. Other suitable techniques or methods facilitating or supporting an extraction or generation of centerlines may also be used.

In an implementation, lane-related navigation information may be added to one or more lane centerlines. For example, after deriving lane centerline geometry from lane boundaries using a lane polygon extraction-type approach or technique, lane-related navigation information may be obtained or derived from road marking information. Some non-limiting examples of lane-related navigation information along with example narratives in connection with types of lane boundaries or lane changing permissions may include those shown in Table 1 below.

| Boundary Type | Lateral Lane Change Permission |
|---|---|
|  | Allow Left & Right Lanes Changing |
|  | Allow Left Lane Changing Only |
|  | Allow Right Lane Changing Only |
|  | No Lane Changing Allowed |

Table 1. Example lane-related navigation information.

As seen in Table 1, solid or dashed lane boundary may indicate or convey, for example, a relationship between lane boundary types as well as their corresponding lane-changing permissions. Accordingly, a spatial relationship of lanes (e.g., a lateral topology, etc.) may be attached to lane centerlines, for example, by determining a type of boundary line. In addition, another type of transport information in connection with road markings represented, for example, by one or more turn or through arrows used on road surfaces to indicate or convey a direction of a lane (e.g., turning direction, pass-through, etc.), such as arrows 308 of FIG. 3A, may be obtained. Thus, knowing a driving direction and incorporating it into a corresponding lane centerline, for example, lane-based road network turning transport information (e.g., a lane-based topology, etc.) may be created or generated.

Figure 4:
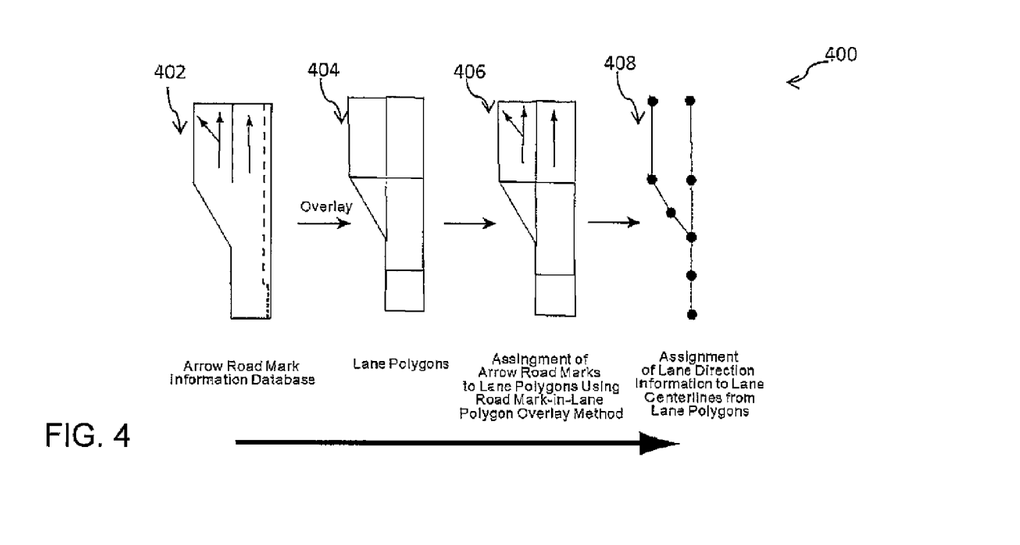
FIG. 4 is a schematic diagram illustrating lane navigation transport information generation.

FIG. 4 illustrates an example summary of a road mark-in-lane polygon overlay method or technique 400 that may be used, partially, dominantly, or substantially, for generating lane navigation transport information from one or more arrow road markings. Claimed subject matter is not limited to an example progression depicted in FIG. 4. As previously mentioned, road arrow marking transport information may be extracted from one or more suitable road marking databases, as indicated generally at 402, just to illustrate one possible implementation. Suitable road arrow marking transport information reflecting lane topological relationships, such as lane directions, speed limit markings, turning information, or the like may be added to a road network arrangement, for example, by overlaying road traffic markings on extracted (e.g., via a lane polygon extraction-type approach, etc.) one or more lane polygons, as indicated at 404. One or more arrow-type road markings may be assigned to or associated with, for example, one or more lane polygons, as further indicated at 406. Lane direction transport information may be assigned to or associated with one or more (e.g., corresponding, suitable, etc.) lane centerlines (e.g., obtained from lane polygons, etc.), as indicated generally at 408. Accordingly, a road marks-in-lane polygon method or technique may effectively or efficiently assign or associate lane direction transport information (e.g., turning, etc.) to a particular lane governed by corresponding arrow road markings.

Figure 5A:
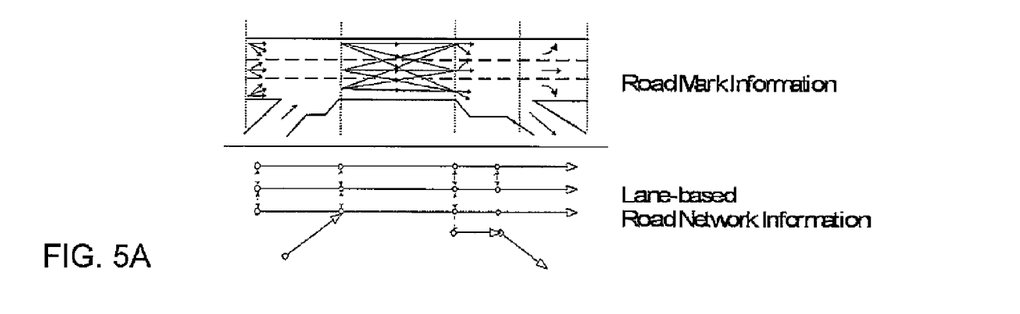
FIGS. 5A and 5B are schematic diagrams illustrating lane-based road transport information.
Figure 5B:
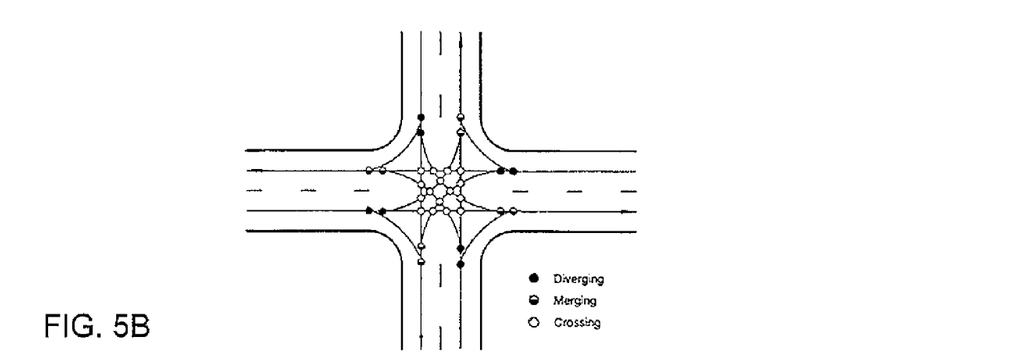

In an implementation, any suitable lane-related navigation transport information, such as, for example, high occupancy vehicle (HOV) or carpool lanes, bus lanes, etc. as well as speed-related information (e.g., speed limits, etc.) may be added to corresponding lane centerlines using, for example, a road mark-in-lane polygon method or technique, as described above. This may make geometric lines spatially meaningful, for example, in the context of lane-based vehicle navigation. As a way of illustration, FIG. 5A depicts lane-based road network transport information extracted, for example, from road markings including lane and centerline geometry as well as lane-related driving information, such as lane connectivity and lane changing information. With respect to intersections, similarly, lane-related navigation transport information may be extracted (e.g., from road markings, etc.) or added using, for example, a road mark-in-lane polygon method or technique. For example, virtual lines or virtual points representing turning connectivity among lanes may be extracted and presented in a manner illustrated in FIG. 5B. Of course, these are merely examples to which claimed subject matter is not intended to be limited.

Figure 6:
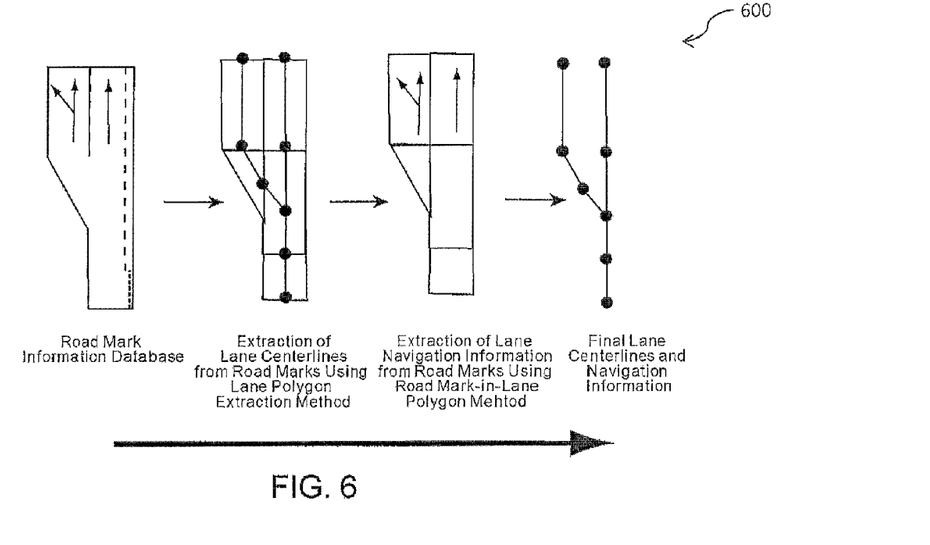
FIG. 6 is a schematic diagram illustrating lane centerlines and navigation transport information generation.

Attention is drawn to FIG. 6, which is a schematic diagram illustrating a summary of an example process 600 for generation of lane centerlines and navigation information, at least in part, from road marking transport information. Again, claimed subject matter is not limited to the progression shown. One or more lane centerlines may be extracted, at least in part, from lane boundary road markings using, for example, a lane polygon extraction-type approach or method. Lane navigation transport information may be extracted from lane traffic road markings using, for example, road mark-in-lane polygon method and may be subsequently combined or integrated with one or more extracted lane centerlines so as to generate or produce lane-based road network transport information. Lane-based road network transport information may, for example, be advantageously utilized, in whole or in part, to effectively or efficiently facilitate or support updating suitable transport or road-related databases.

Figure 7:
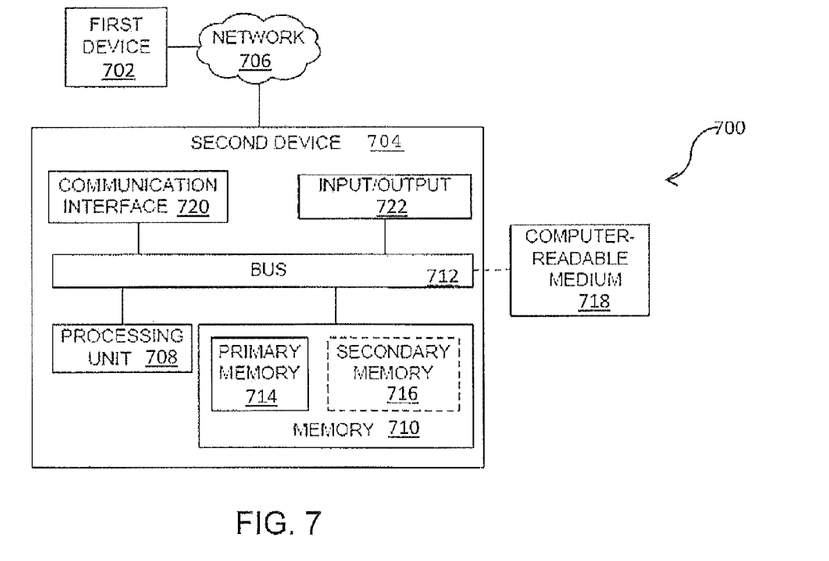
FIG. 7 is a schematic diagram illustrating an implementation of a computing environment associated with one or more special purpose computing systems or devices.

FIG. 7 is a schematic diagram illustrating an example computing environment 700 that may include one or more devices that may be capable of implementing a process for lane-based road network transport information generation using one or more approaches, such as, for example, a lane polygon extraction-type approach or method, as discussed above. For example, in an implementation, one or more lane centerlines may be extracted from lane boundary road marks using, at least in part, a lane polygon extraction-type approach or method. Lane-related navigation information may, for example, be extracted from one or more suitable lane traffic road marks via a road mark-in-lane polygon method and then combined with the extracted lane centerlines to produce or generate a lane-based road network information utilizing, in whole or in part, computing environment 700.

Computing environment system 700 may include, for example, a first device 702 and a second device 704, which may be operatively coupled together via a network 706. In an embodiment, first device 702 and second device 704 may be representative of any electronic device, appliance, or machine that may have capability to exchange signal information via network 706. Network 706 may represent one or more communication links, processes, or resources having capability to support exchange or communication of signal information between first device 702 and second device 704. Second device 704 may include at least one processing unit 708 that may be operatively coupled to a memory 710 through a bus 712. Processing unit 708 may represent one or more circuits to perform at least a portion of one or more signal and information processing procedures or methods.

Memory 710 may represent any information storage mechanism. For example, memory 710 may include a primary memory 714 and a secondary memory 716. Primary memory 714 may include, for example, a random access memory, read only memory, etc. In certain implementations, secondary memory 716 may be operatively receptive of, or otherwise have capability to be coupled to, a computer-readable medium 718.

Computer-readable medium 718 may include, for example, any medium that is able to store or provide access to signals and information, including code or instructions, for one or more devices in system 700. A storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signal information, in whole or in part, in the form of zeros may change a state to represent signal information, in whole or in part, as binary digital electrical signal and information in the form of ones, just to illustrate one possible implementation. As such, "non-transitory" may refer, for example, to any medium or device remaining tangible despite this change in state.

Second device 704 may include, for example, a communication adapter or interface 720 that may provide for or otherwise support communicative coupling of second device 704 to a network 706. Second device 704 may include, for example, an input/output device 722. Input/output device 722 may represent one or more devices or features that may be able to accept or otherwise input human or machine instructions, or one or more devices or features that may be able to deliver or otherwise output human or machine instructions.

According to an implementation, one or more portions of an apparatus, such as second device 704, for example, may store one or more binary digital electronic signals representative of signal information expressed as a particular state of a device, for example, second device 704. For example, an electrical binary digital signal representative of signal information may be "stored" in a portion of memory 710 by affecting or changing a state of particular memory locations, for example, to represent signal information as binary digital electronic signals and information in the form of ones or zeros. In a particular implementation of an apparatus, such a change of state of a portion of a memory within a device, such a state of particular memory locations, for example, to store a binary digital electronic signal representative of information may constitute a transformation of a physical thing, for example, memory device 710, to a different state or thing.

Thus, as illustrated in various example implementations or techniques presented herein, in accordance with certain aspects, a method may be provided for use as part of a special purpose computing device or other like machine that accesses digital signals and information from memory and processes such digital signals and information to establish transformed digital signals and information which may be stored in memory as part of one or more information files or a database specifying or otherwise associated with an index.

Some portions of the detailed description herein are presented in terms of algorithms or symbolic representations of operations on binary digital signals and information stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal and information processing or related arts to convey the substance of their work to others skilled in the art. An algorithm is here, and generally, is considered to be a self-consistent sequence of operations or similar signal and information processing leading to a desired result. In this context, operations or processing involve physical manipulation of physical quantities. Typically, although not necessarily, such quantities may take the form of electrical or magnetic signals and information capable of being stored, transferred, combined, compared or otherwise manipulated. It has proven convenient at times, principally for reasons of common usage, to refer to such signals and information as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals and information, typically represented as physical electronic or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, or equivalents may be substituted, without departing from claimed subject matter. Additionally, many modifications may be made to adapt a particular situation. Therefore, it is intended that claimed subject matter not be limited to particular examples disclosed, but that claimed subject matter may also include all implementations falling within the scope of the appended claims, or equivalents thereof.

What is claimed is:

1. A method comprising: electronically generating lane-based road network transport information, said generating comprising:
    extracting one or more digital signals and information representative of one or more lane polygons from one or more lane boundary markings associated with a road marking database; wherein said road marking database comprises, at least in part, one or more digital signals and information representative of road marking transport information stored in a vector format for graphical representation;
    electronically generating one or more lane centerlines from at least one of said one or more lane polygons;
    electronically generating road navigation transport information for said lane centerlines from road traffic markings of said road marking database; and
    electronically combining said lane centerlines and said road navigation transport information.

2. The method of claim 1, wherein said road traffic markings comprise digital signals and information to graphically represent at least one of the following: a solid lane boundary; a dashed lane boundary; a turn arrow, a through arrow; a speed limit; lane information; or any combination thereof.

3. The method of claim 1, wherein said one or more lane polygons are extracted in connection with an application of a lane polygon extraction-type approach.

4. The method of claim 1, wherein said one or more lane boundary markings are represented via one or more polyline segments stored as digital information in said road marking database.

5. The method of claim 4, wherein said one or more polyline segments comprise one or more arrays of one or more nodes.

6. The method of claim 5, wherein said one or more nodes comprises at least one of the following: an end-node of lane boundary; an end-node of a road; a non-end or intermediate node; a non-end-node of a road; or any combination thereof.

7. The method of claim 1, wherein said one or more lane polygons are extracted in connection with electronically locating one or more seed nodes.

8. The method of claim 1, wherein said one or more lane polygons comprises at least one of the following: a quadrangular lane polygon; a triangular lane polygon; or any combination thereof.

9. The method of claim 1, wherein said one or more lane polygons are extracted in connection with performing a closed polygonal sequence-type technique.

10. An article comprising: a storage medium having non-transitory instructions stored thereon executable by a special purpose computing platform to:
   electronically generate lane-based road network transport information, said instructions to said generate further comprise instructions to:
   extract digital information representative of one or more lane polygons from one or more lane boundary markings associated with a road marking database; wherein said road marking database comprises, at least in part, digital information representative of road marking transport information stored in a vector format for graphical representation;
   electronically generate one or more lane centerlines from at least one of said one or more lane polygons;
   electronically generate road navigation transport information for said lane centerlines from road traffic markings of said road marking database; and
   electronically combine said lane centerlines and said road navigation transport information.

11. The article of claim 10, wherein said road traffic markings comprise digital information to graphically represent at least one of the following: a solid lane boundary; a dashed lane boundary; a turn arrow, a through arrow; a speed limit; lane information; or any combination thereof.

12. The article of claim 10, wherein said non-transitory instruction to extract said one or more lane polygons further comprises instructions to extract said polygons in connection with an application of a lane polygon extraction-type approach.

13. The article of claim 10, wherein said one or more lane polygons comprises at least one of the following: a quadrangular lane polygon; a triangular lane polygon; or any combination thereof.

14. The article of claim 10, wherein said non-transitory instruction to extract said one or more lane polygons further comprises instructions to extract said polygons in connection with performing a closed polygonal sequence-type technique.

15. An apparatus comprising: a special purpose computing platform comprising at least one processor coupled to a memory to:
   electronically generate lane-based road network transport information, in which said computing platform is to:
   extract digital information representative of one or more lane polygons from one or more lane boundary markings associated with a road marking database; wherein said road marking database comprises, at least in part, digital information representative of road marking transport information stored in a vector format for graphical representation;
   electronically generate one or more lane centerlines from at least one of said one or more lane polygons;
   electronically generate road navigation transport information for said lane centerlines from road traffic markings of said road marking database; and
   electronically combine said lane centerlines and said road navigation transport information.

16. The apparatus of claim 15, wherein said one or more lane boundary markings are represented via one or more polyline segments stored as digital information in said road marking database.

17. The apparatus of claim 16, wherein said one or more polyline segments comprise one or more arrays of at least one of the following: an end-node of lane boundary; an end-node of a road; a non-end or intermediate node; a non-end-node of a road; or any combination thereof.

* * * * *